US006550670B1

(12) United States Patent
Lewis et al.

(10) Patent No.: US 6,550,670 B1
(45) Date of Patent: Apr. 22, 2003

(54) AUTOMATED BANKING MACHINE ENCLOSURE

(75) Inventors: Kim R. Lewis, Stow, OH (US); Richard C. Lute, Jr., Mogadore, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 09/441,180

(22) Filed: Nov. 15, 1999

Related U.S. Application Data

(60) Provisional application No. 60/109,779, filed on Nov. 25, 1998.

(51) Int. Cl.[7] .............................................. G06F 17/60

(52) U.S. Cl. ...................... 235/379; 235/371; 235/380; 235/382; 902/8; 902/20; 902/30; 902/31; 902/32; 902/33; 902/34; 902/35

(58) Field of Search ............................ 235/379, 901–8, 235/380, 382

(56) References Cited

U.S. PATENT DOCUMENTS

| | | | | | |
|---|---|---|---|---|---|
| 4,355,369 | A | * | 10/1982 | Garvin | 235/379 X |
| D272,291 | S | * | 1/1984 | Hauser et al. | D31/99 |
| D283,937 | S | * | 5/1986 | Prinzhorn | D99/28 |
| D291,936 | S | * | 9/1987 | Long | D99/43 |
| D332,165 | S | * | 12/1992 | Fukutake et al. | D99/28 |
| 5,202,549 | A | * | 4/1993 | Decker et al. | 235/379 |
| D360,739 | S | * | 7/1995 | Hall | D99/28 |
| 5,503,088 | A | * | 4/1996 | Hayman | 109/50 |
| 5,592,377 | A | * | 1/1997 | Lipkin | 395/242 |
| 5,615,623 | A | * | 4/1997 | Capraro, Jr. | 109/2 |
| 5,642,922 | A | * | 7/1997 | Ramachandran et al. | 235/379 X |
| 5,650,605 | A | * | 7/1997 | Morioka et al. | 235/379 |
| D386,883 | S | * | 11/1997 | Do et al. | D99/28 |
| 5,937,396 | A | * | 8/1999 | Konya | 205/43 |
| 5,984,177 | A | * | 11/1999 | Do et al. | 235/379 |
| 6,024,027 | A | * | 2/2000 | Esmaili | 109/50 |
| 6,061,666 | A | * | 5/2000 | Do et al. | 235/379 X |
| 6,082,616 | A | * | 7/2000 | Lewis et al. | 235/379 |
| 6,196,457 | B1 | * | 3/2001 | Patterson | 235/379 |

* cited by examiner

*Primary Examiner*—Thien M. Le
*Assistant Examiner*—Daniel Walsh
(74) *Attorney, Agent, or Firm*—Ralph E. Jocke; Daniel D. Wasil; Walker & Jocke

(57) ABSTRACT

An automated banking machine includes a generally one-piece polymer frame. Transaction function devices such as an input device, a display screen, and a sheet dispenser, are supported on the frame. A generally one-piece polymer body is operatively engaged relative to the frame and extends in generally surrounding relation of the input device and display screen. The body includes at least one opening such that the display screen is visible and the input device is accessible through the body.

67 Claims, 8 Drawing Sheets

AUTOMATED BANKING MACHINE ENCLOSURE

This application claims the benefit of U.S. Provisional Application No. 60/109,779, filed Nov. 25, 1998.

TECHNICAL FIELD

This invention relates to automated banking machines. Specifically this invention relates to an enclosure structure for an automated banking machine.

BACKGROUND ART

Automated banking machines are known in the prior art. A common type of automated banking machine is an automated teller machine (ATM). Users operate ATMs to conduct banking transactions. Transactions commonly conducted at ATMs include dispensing cash, making deposits, making account balance inquiries, making transfers between accounts, paying bills, cashing checks and other types of automated transactions. Other types of automated banking machines perform different or additional functions such as dispensing tickets, dispensing or receiving gaming materials, or providing payment for goods or services. For purposes of this disclosure any machine that is capable of accomplishing transactions involving transfers of value shall be considered an automated banking machine.

Automated banking machines include enclosures that house components used to carry out transactions. ATM enclosures are usually comprised of metal. The enclosure commonly includes a chest portion. The chest portion often houses currency, deposits and the mechanisms that handle these items. The chest portion also generally houses critical electronic components that must be protected from tampering. The chest portion also commonly has an access door which is controlled by a suitable lock. The lock prevents access to the interior of the chest by unauthorized personnel. The type of chest used often varies with the type of ATM and the location where the machine is to be installed. Machines which operate in environments where they may be unattended for substantial periods of time commonly have higher security chests and enclosures than machines which are installed in lobbies of buildings, stores or other places where guards or other people are usually present.

Banking machine enclosures also often include less secure portions in addition to the chest portion. These less secure enclosure portions house items such as printers, screen displays, card readers and other items that are less valuable and/or less susceptible to tampering than those items within the chest. While the less secure portions of ATM enclosures do not provide as high a degree of security as the chest portion, access to less secure portions is also generally controlled through locking mechanisms. This is done to discourage access and tampering by unauthorized personnel. The locking mechanisms generally enable authorized personnel to obtain quick access for purposes of routine maintenance such as changing paper rolls and printer ribbons.

Automated banking machine enclosures presently are generally constructed in a manner suitable for either a lobby installation environment or a through-the-wall installation environment. In a lobby installation environment the machine is generally freestanding within an interior area of a building. The machine is usually exposed on all sides except the bottom. As persons are generally present in close proximity to the machine in a lobby environment, an extremely high degree of security is generally not required. This is because persons are generally present to report or stop any improper activity that is occurring to try to open the machine. Because the machine is in view in a lobby installation, efforts are generally made to make the enclosure look as attractive as possible. This is often done by forming the enclosure so that it includes rounded shapes, surface coatings, attractive color schemes and the like. This adds to the cost of the machine.

Another common type of ATM configuration is a through-the-wall configuration. In a through-the-wall installation, the machine is mounted so that the enclosure of the machine is positioned on a first side of an interior or exterior building wall. The customer interface of the machine is positioned to be accessible through an opening in the wall. A customer positioned on the opposite side of the wall from the enclosure is enabled to operate the machine. Through the wall machines are designed to be operated by users who either walk up or drive up to the interface. In such installations, the enclosure for the ATM is not required to be as attractive as a lobby unit because the enclosure is generally not visible to users of the machine.

When an ATM is mounted through an exterior wall of a building, steps generally must be taken to prevent damage to machine components due to the infiltration of rain and snow into the interior of the machine. As the machine interface is exposed to the elements, generally only the interface needs to be weatherproofed. The other portions of the enclosure are positioned inside a building structure which minimizes the exposure of components not adjacent to the interface to outside elements.

Sometimes it is desired to provide an automated banking machine in a location where there is no building wall through which a through-the-wall mounting may be made. In these situations it is common to construct a vestibule or similar enclosure for housing the ATM. The machine may then be mounted in the enclosure in a through-the-wall type configuration. In such circumstances, the vestibule serves as a small building for housing the ATM enclosure.

There are sometimes locations external to building lobbies where it would be desirable to position an ATM, but there is insufficient room to construct a vestibule or similar enclosure. For these locations there is no satisfactory banking machine which can be installed. While a machine designed for installation in a lobby may be placed in the location, such machines are generally not resistant to the elements and damage would soon occur due to exposure. Such damage may commonly occur due to infiltration of moisture and dirt into the machine and extremes of heat and cold. In addition, exterior locations are often unattended. This results in a greater risk of damage and break-in to the machine. Lobby units generally are not built to withstand lengthy attacks by machine tools that could more readily be attempted in an unattended external environment.

Thus there exists a need for an automated banking machine enclosure that can be installed in an external environment without requiring a surrounding vestibule or similar structure. There further exists a need for an automated banking machine enclosure that is durable and resistant to attack to a sufficient degree to be installed in an unattended outdoor environment.

There further exists a need for an automated banking machine enclosure that can be made more attractive at a relatively lower cost than existing enclosures. There further exists a need for an automated banking machine enclosure that is simpler in construction and which can be produced at a lower cost.

DISCLOSURE OF INVENTION

It is an object of the present invention to provide an automated banking machine.

It is a further object of the present invention to provide an automated banking machine enclosure that is sufficiently durable to withstand placement in an attended indoor environment or an unattended outdoor environment.

It is a further object of the present invention to provide an automated banking machine enclosure that can be installed in an outdoor environment without the need for a surrounding vestibule.

It is a further object of the present invention to provide an automated banking machine enclosure that is more economical to manufacture and maintain.

It is a further object of the present invention to provide an automated banking machine enclosure that enables providing a machine with a more attractive appearance, including various shapes and colors. The appearance may also provide written or electronic information, including public assistance or advertisements.

It is a further object of the present invention to provide an automated banking machine enclosure that provides ease of assembly.

It is a further object of the present invention to provide an automated banking machine enclosure that provides improved access to serviceable components within the machine.

It is a further object of the present invention to provide an automated banking machine enclosure that is suitable for use either in an indoor or outdoor environment.

It is a further object of the present invention to provide an automated banking machine enclosure that is economical yet resistant to attack.

It is a further object of the present invention to provide an automated banking machine enclosure that is capable of providing a controlled interior environment to facilitate more reliable operation of temperature sensitive components therein.

Further objects of the present invention will be made apparent in the following Best Modes For Carrying Out Invention and the appended claims.

The foregoing objects are accomplished in an exemplary embodiment of the present invention by an automated banking machine which comprises a frame. In an exemplary embodiment of the invention the frame is made of a generally one-piece polymer. The frame of the machine is in supporting connection with at least one input device such as a card reader, keypad or function keys. The frame is also in supporting connection with a display screen, such as a CRT display, LCD or touch screen interface. The frame is further in supporting connection with at least one sheet dispenser device which is selectively operative to dispense sheets such as currency notes.

The automated banking machine further includes a generally one piece nonmetallic body. In an exemplary embodiment of the invention, the body is made of polymer. The polymer body is in operatively supporting engagement with the frame and extends in generally surrounding relation of the input devices and the display screen. The body includes at least one opening through which the display screen may be viewed and/or at least one input device may be accessed. In certain preferred forms of the invention, the polymer body and/or frame are comprised of a reaction injection molded (RIM) thermoset olefin material, which enables producing machines with an attractive appearance, provides weather resistance and provides resistance to many forms of attack.

BEST MODES FOR CARRYING OUT INVENTION

Figure 1:
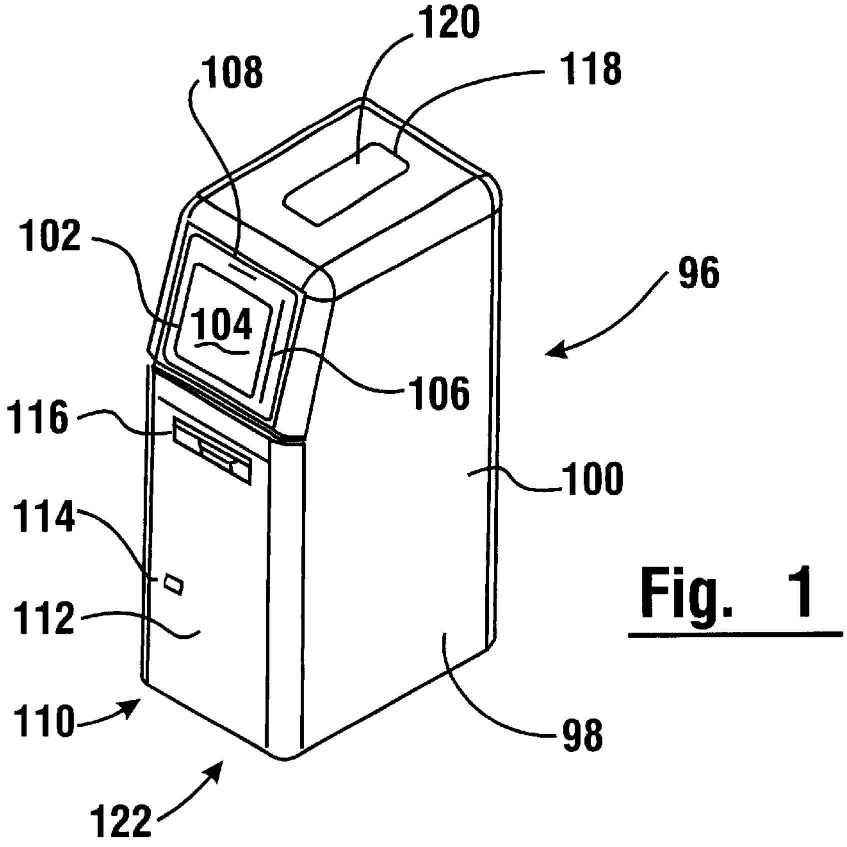
FIG. 1 is an isometric view of an automated banking machine having an enclosure which includes an exemplary embodiment of the present invention.
Figure 2:
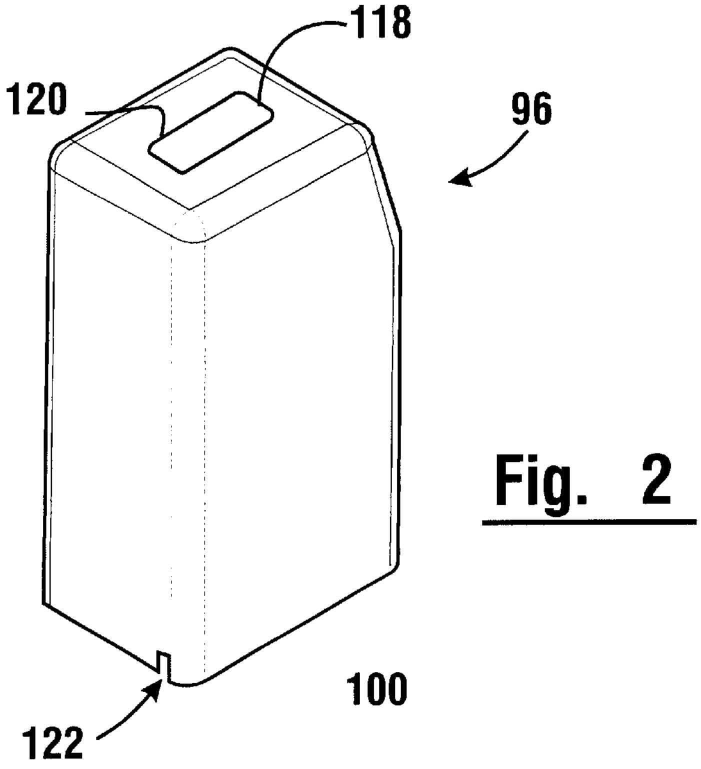
FIG. 2 is a rear isometric view of the automated banking machine shown in FIG. 1.

Referring now to the drawings and particularly to FIG. 1, there is shown therein an automated banking machine of a first exemplary embodiment of the present invention generally indicated 96. Automated banking machine 96 of this exemplary embodiment is an ATM suitable for conducting banking transactions.

As will be appreciated, an enclosure 98 of the exemplary automated banking machine 96 provides a durable, high-strength enclosure for the components of the machine. Machine 96 further provides an attractive appearance due to its stylized enclosure . The enclosure may be made in numerous shapes. Of course, while the first described form of the invention is particularly well-suited to an indoor, attended environment, the invention may also be used in outdoor, unattended environments as well.

FIG. 1 shows the automated banking machine of the present invention having the enclosure 98. Enclosure 98 is comprised of a generally one-piece nonmetallic body 100. The body may be comprised of any nonmetallic material capable of being formed into a one-piece body. For example, such material may be comprised of plastic, polymer, fiberglass, resin, or glass, or any combination of such.

As shown in FIG. 1, the enclosure 98 of machine 96 includes body 100. In this exemplary embodiment, body 100 is comprised of a generally one-piece polymer body comprised of reaction injection molded (RIM), thermoset olefin plastic material. In the described embodiment the thermoset olefin material is of the type produced by the polymerization of dicyclopentadine (DCPD) based co-monomers. Such materials provide suitable strength, weather, impact, and heat resistance to achieve a suitable body for indoor or outdoor operation of the exemplary automated banking machine. An example of a commercially available polymer of this type is sold under the brand Telene™ by the BF Goodrich Company or Metton™ by Metton America.

In this exemplary embodiment, body 100 is molded generally as a single piece and may be molded into selected shapes to provide an attractive appearance for the machine. The body 100 in other machines of the invention may be polygonal, circular, or any other shape and color. In addition, body 100 in automated banking machines of the invention may include a top surface that is sloped away from an opening in the body. This generally facilitates conducting rain, snow, dirt and the like, away from the input and output devices which are accessible through the opening. The top surface may also be generally smoothly integrated into the sides of the body to facilitate the shedding of moisture therefrom as well as to provide an attractive profile.

Polymer body 100 includes an opening 102 through which a display screen 104 is visible. Body 100 further includes a device opening 106, which in the described embodiment comprises a slot sized for accepting a card of a user. A further device opening 108 provides access for delivering receipts or other documents to a user of the machine 96.

Body 100 further includes an opening generally indicated 110 in a bottom portion of the housing. Opening 110 in the operative position of the machine is covered by a door 112. Door 112 is selectively secured by a locking mechanism 114. Locking mechanism 114 enables authorized persons to selectively open door 112 to access the interior of body 100. Door 112 further includes a sheet opening 116 through which sheets such as currency notes may be delivered to a user.

Body 100 further includes a roll installation opening 118 in an upper surface thereof. Roll installation opening 118 in the operative condition is closed by a roll cover 120. It should further be understood that in embodiments of the invention, body 100 may include an opening in the bottom portion schematically indicated 122, which extends through the bottom of the housing. Alternatively, the bottom portion of the body 100 may be closed. As will be appreciated from the following discussion the bottom opening 122 may be used in lieu of opening 110 in some embodiments, and vice versa. Of course, some embodiments may include both openings.

Figure 3:
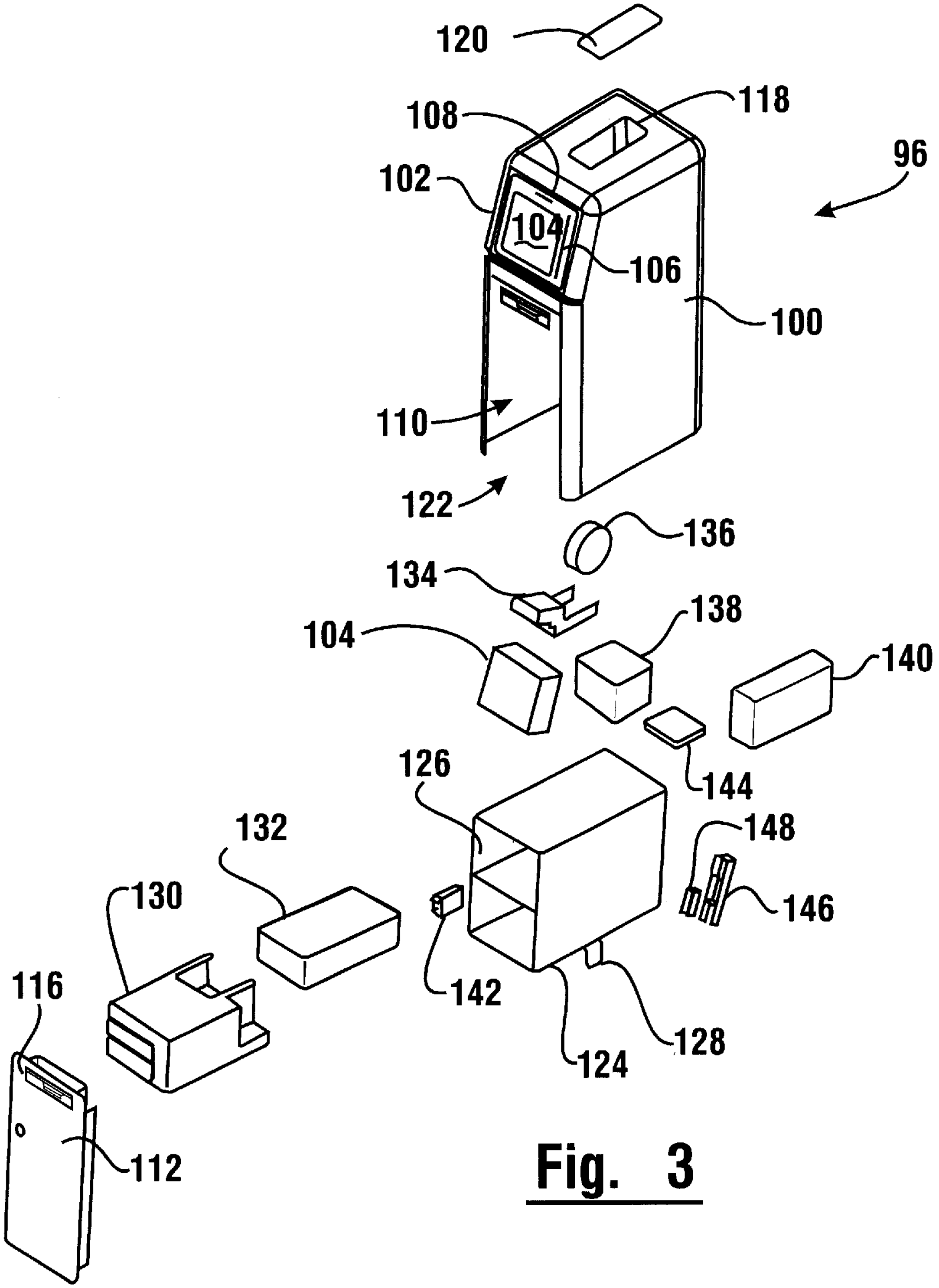
FIG. 3 is an exploded view of the major components of the automated banking machine shown in FIG. 1.
Figure 4:
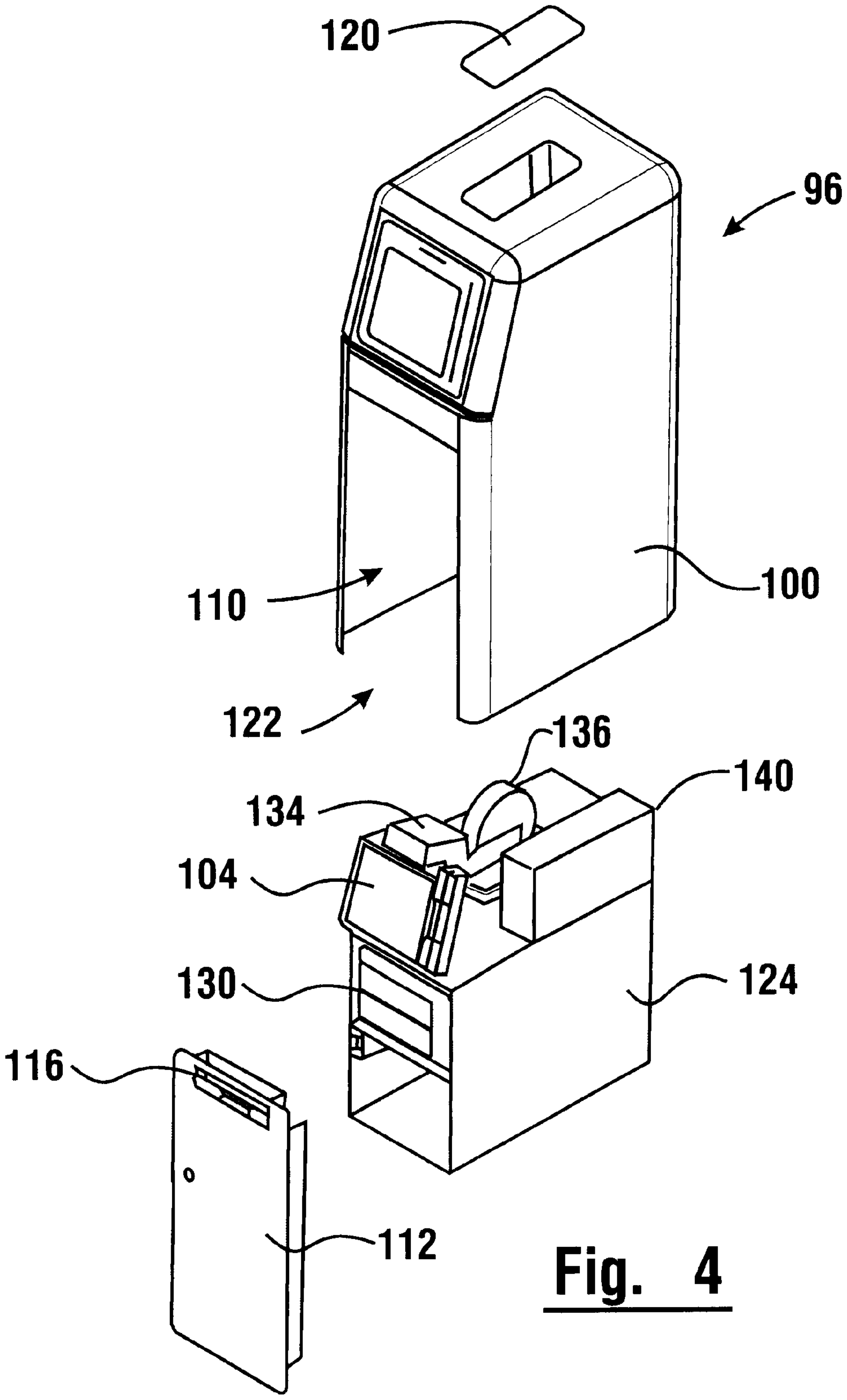
FIG. 4 is an exploded isometric view similar to FIG. 3 but with certain of the components of the machine in an assembled condition.
Figure 7:
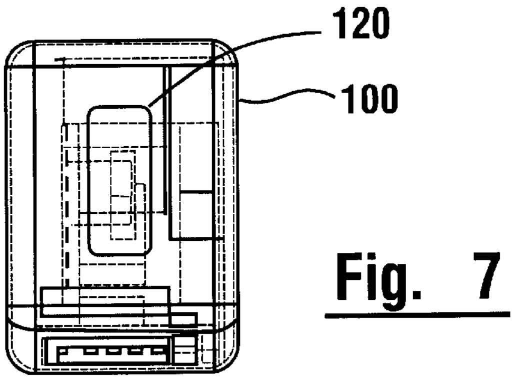
FIG. 7 is a top view of the automated banking machine shown in FIG. 5.
Figure 5:
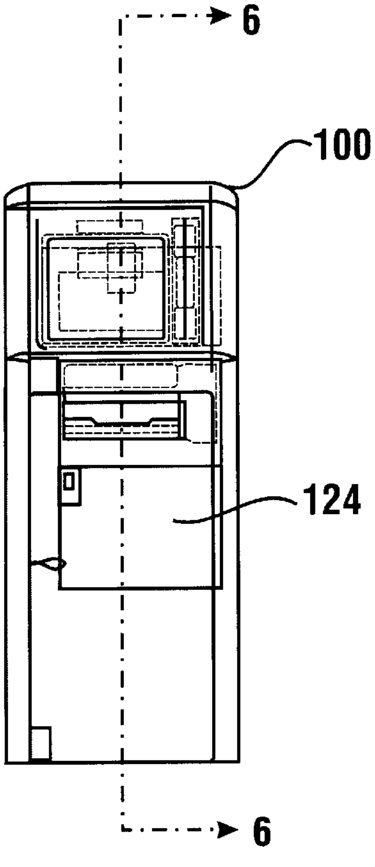
FIG. 5 is a front plan view of the automated banking machine shown in FIG. 1.
Figure 6:
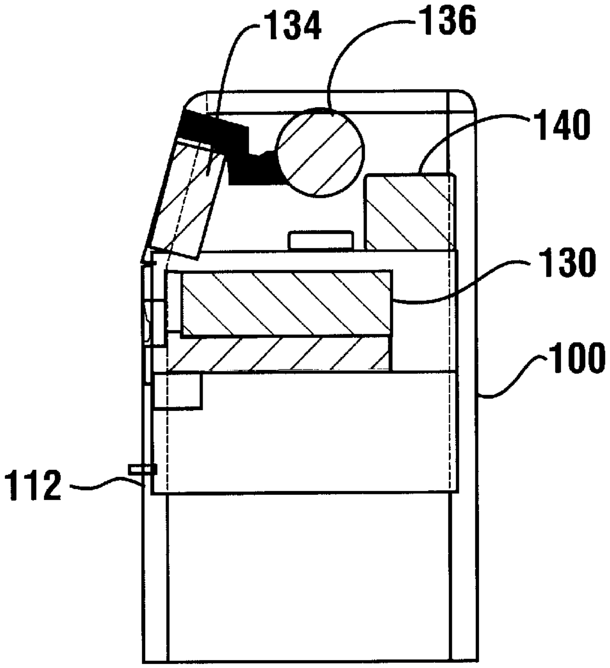
FIG. 6 is a side cross-sectional view taken along lines 6—6 in FIG. 5.
Figure 8:
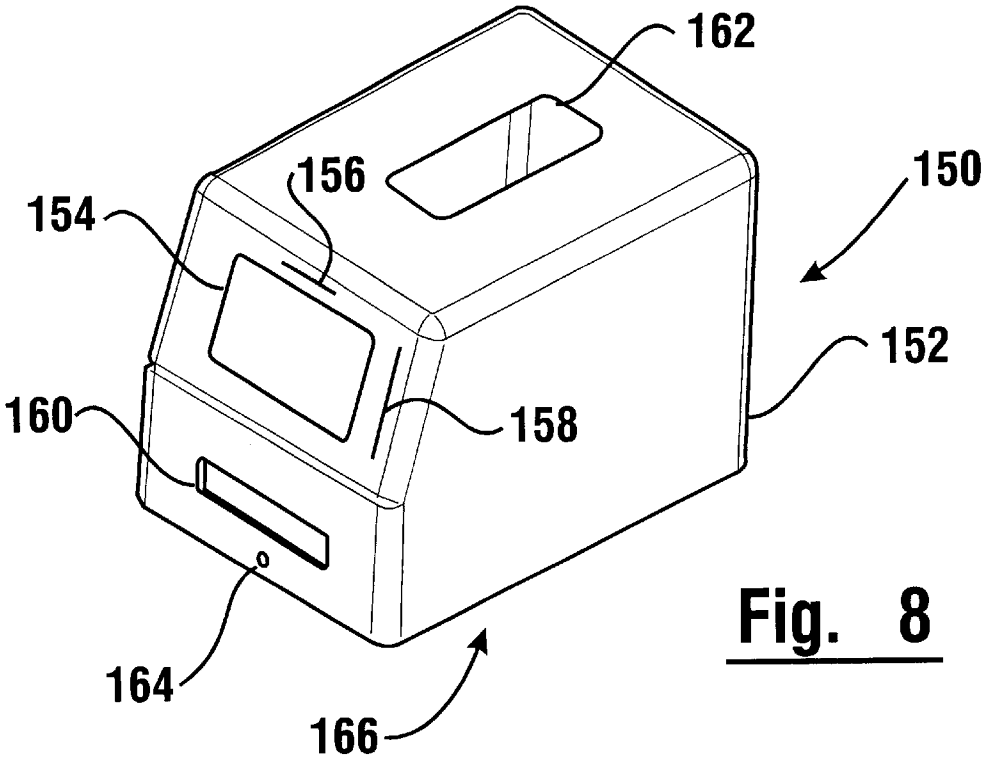
FIG. 8 is a front isometric view of a further alternative embodiment of an automated banking machine of the present invention.
Figure 9:
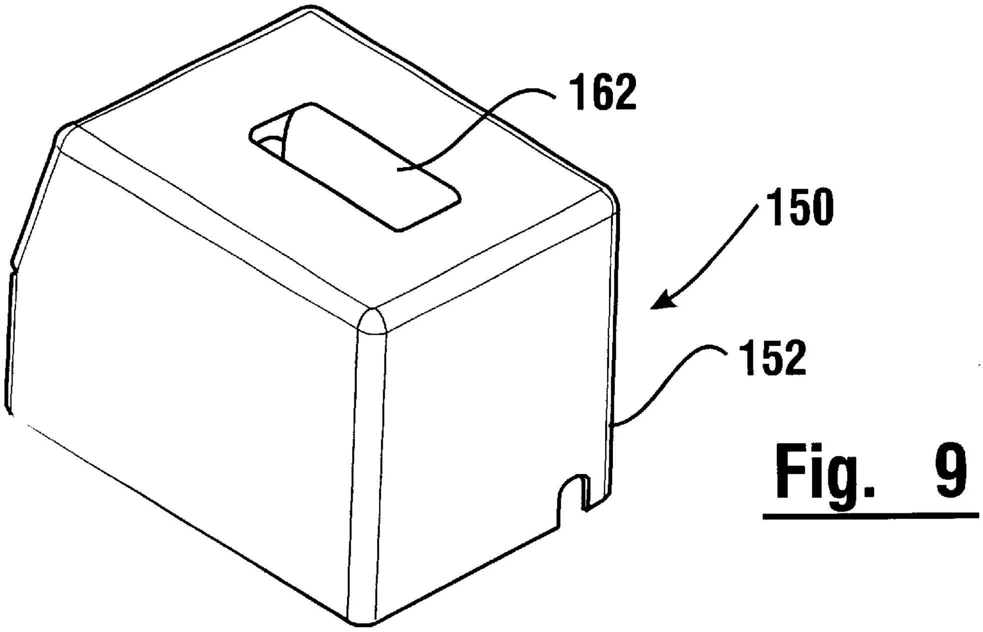
FIG. 9 is a rear isometric view of the machine shown in FIG. 8.
Figure 12:
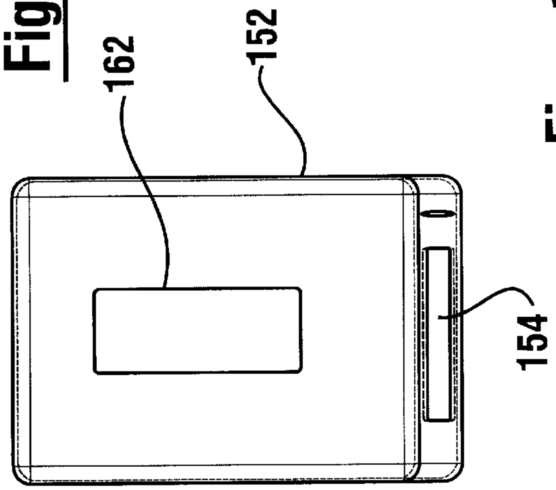
FIG. 12 is a top view of the machine shown in FIG. 8.
Figure 10:
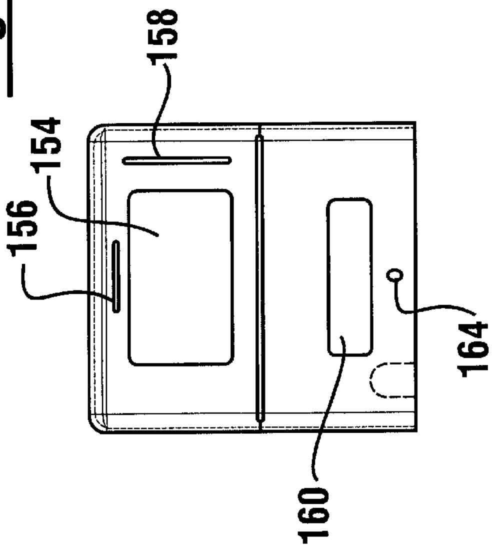
FIG. 10 is a front plan view of the machine shown in FIG. 8.
Figure 11:
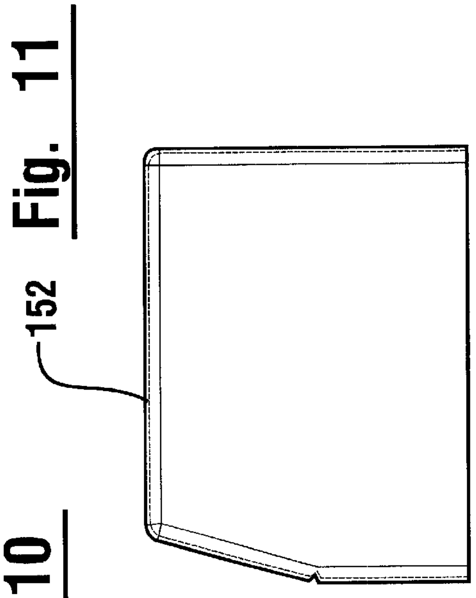
FIG. 11 is a side view of the machine shown in FIG. 8.
Figure 13:
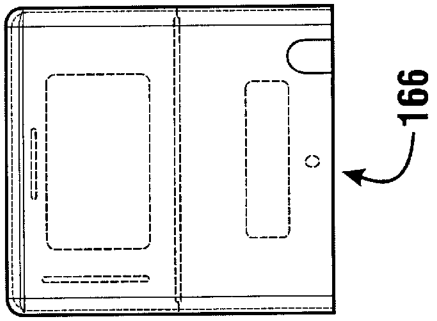
FIG. 13 is a rear elevational view of the machine shown in FIG. 8.

As shown in FIGS. 3 and 4, automated banking machine 96 includes a frame 124. Frame 124 includes a generally rectangular housing which bounds an interior area 126. In the described form of machine 98, frame 124 includes a generally one-piece frame comprised of polymer material. Of course, in other embodiments other constructions or materials may be used. Frame 124 is sized to be insertable into the interior of body 100. This is accomplished in various embodiments either through opening 110 or opening 122. When frame 124 is inserted within the interior of the body 100, it may be secured therein by a fastening mechanism schematically indicated 128. Fastening mechanism 128 may comprise any combination of releasable or permanent fastening members or devices which enable frame 124 to be secured in the interior of the body.

The machine includes input devices such as a card reader, keypad, and function buttons. The machine further includes output devices such as a display screen and printer. It should be appreciated that these input and output devices are exemplary and that other embodiments may include additional or different types of input devices which operate to receive information or instructions from users and/or output devices which provide information or instructions to users.

Frame 124 has in supporting connection therewith a display screen 104, which in the described form of the invention comprises an LCD type touch screen. Also in supporting connection with frame 124 is a sheet dispenser 130. Sheet dispenser 130 has in connection therewith a releasable sheet holding canister 132. In the operative position sheet dispenser 130 is positioned in interior area 126 of the frame and is aligned with sheet opening 116 in door 112.

Frame 124 is also in supporting connection in the described embodiment with a printer 134. Printer 134 in the described form of the invention is a thermal printer which is operative to print indicia on paper which is supplied from a paper roll 136. In the operative position of the frame when it is inserted in the body, the paper roll 136 is positioned in a printer roll holding area which generally underlies roll installation opening 118 in the body. This enables installing replacement rolls by opening roll cover 120. The printer roll holding area is preferably generally isolated from other machine components except that paper from the roll may pass therefrom to the printer. Receipts or other documents that have been printed by the printer assembly 134 are delivered to users of the machine through opening 108, which is aligned with an outlet area of the printer 134 in the inserted position of the frame in the body.

Frame 124 is also in supporting connection with a controller 138. Controller 138 in the described embodiment comprises a processor and an operatively connected data store. The data store includes data and information which enables the processor to control the operation of other devices in the machine to which the processor is operatively connected. It should be understood that other embodiments of the invention may include a plurality of operatively connected processors and data stores. A power supply 140 is also in operatively supporting connection with the frame in the described embodiment. Power supply 140 is operative to receive AC power through a surge protecting junction box 142 and to deliver suitable DC power for operation of the components within the machine.

The frame is also in supporting connection in the described embodiment with a modem 144. Modem 144 is a dial-up modem which may be operatively connected with a telephone line through which machine 96 may communicate transaction messages. It should be understood, however, that in other embodiments of the invention other types of communication interface devices for communicating over phone lines, lease lines, cellular connections or other suitable communication mediums may be used.

Frame 124 is further in supporting connection with a card reader retainer 146. Card reader retainer includes a guide slot therein. A swipe type magnetic stripe card reader 148 is supported on the retainer 146. Card reader 148 is mounted such that when the frame is inserted into the body to the operative position, the card reader and retainer are aligned and in generally underlying relation with the slot comprising device opening 106.

As shown in FIG. 4, the exemplary form of machine 96 provides for a generally compact assembly of transaction function devices in supporting connection with the frame 124. The frame and the devices thereon are insertable into the interior of the body 100 through either opening 110 or opening 122. The frame may be inserted in the body until the transaction function devices are generally aligned with the corresponding openings in the body. Once the frame is in the inserted position, the frame is secured within the body through a releasable fastening mechanism. In the described form of the invention, other than replacement of paper rolls which can be accomplished by removal of roll cover 120, servicing the components of the machine may be readily accomplished by releasing the fastening mechanism and removing the frame from its inserted position in the body.

Figure 16A:
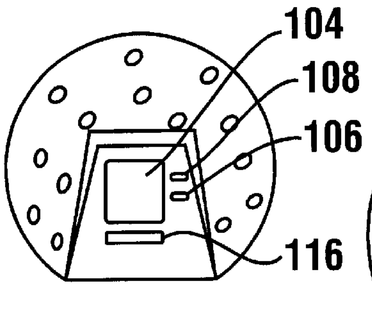
FIGS. 16A–16G show bodies designed to represent or form all of or a part of specific figures and shapes for automated banking machine enclosures.
Figure 16B:
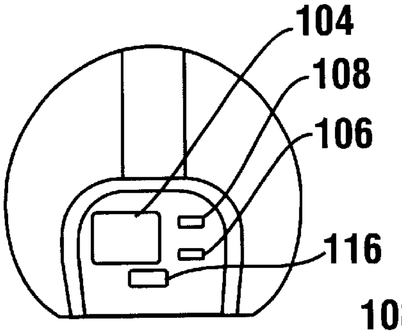
Figure 16C:
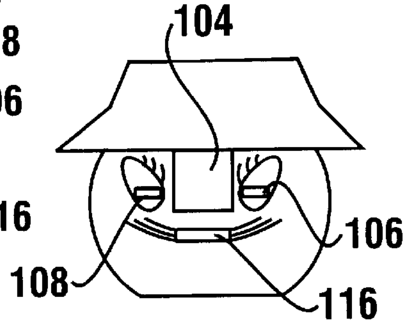
Figure 16D:
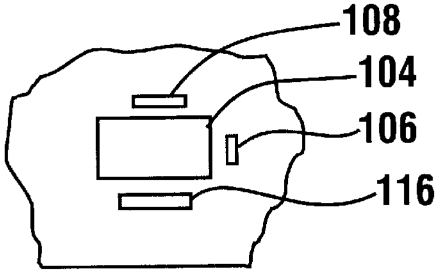
Figure 16E:
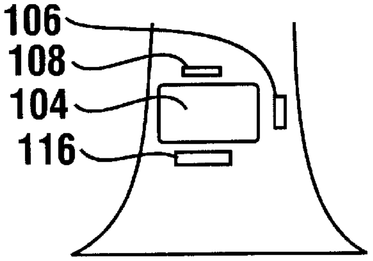
Figure 16F:
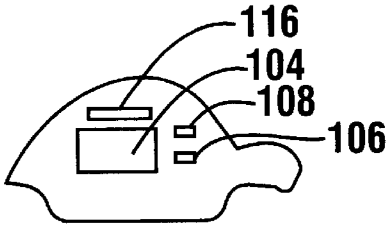
Figure 16G:
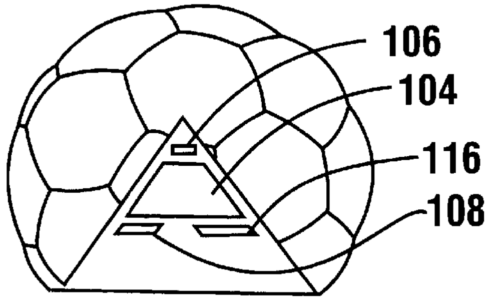

In the exemplary embodiment of the machine 96, the generally one piece polymer body extends in surrounding relation of the display screen, input devices and most other transaction function devices of the machine. The body also provides an attractive enclosure of the machine. The body may be molded into or form a part of many attractive shapes. The body may be designed to represent or form all of or a part of specific figures and shapes, for example cartoon characters, animals, rocks, tree portions, and faces for use at amusement parks. The body may also be designed in the shape and colors of specific football helmets, baseball caps, soccer balls, golf balls, tennis balls or other sports-related items. The body may include product advertisements. Also the body may include designer artwork by artists or celebrities. FIGS. 16A–16G show alternative forms of automated banking machines with a body molded into or forming all of or a part of a shape representative of a golf ball (FIG. 16A); football helmet (FIG. 16B); artistic face (FIG. 16C); rock (FIG. 16D); lower tree portion (FIG. 16E); animal (FIG. 16F); and soccer ball (FIG. 16G). In FIG. 16C the top overhang may be used to provide a protective covering against rain and snow. The bodies shown in FIGS. 16A, 16B, and 16G show a recessed interface which also may provide a protective covering. The bodies shown in FIGS. 16D and 16E may be used to blend in with nature. Such bodies may be particularly suited for exterior, unattended environments. The non-metallic bodies and/or frame structures also provide an insulated environment in which suitable temperature and humidity conditions may be maintained.

The bodies of automated banking machines of the invention further provide an external supporting structure that is highly resistant to various forms of attack. It should further be understood that the structure of the exemplary embodiment shown provides for the frame 124 to be upwardly disposed in the body from the opening 122 in the bottom portion of the body. This enables securing structures such as anchors and other members to be attached to the interior of the body through various fastening techniques. This further provides additional means of securing the body in position to prevent attack or removal thereof. Forms of the invention may have the body and/or frame comprised of RIM thermoset olefin polymer of the types previously described or other suitable materials which provide the desirable features of strength toughness, durability and attack resistance. The structural arrangement of machine 96 provides ease of assembly and improved access to the machine components for servicing.

FIGS. 8 through 15 disclose a further alternative embodiment of an automated banking machine of the present invention generally indicated 150. Machine 150 is generally similar to automated banking machine 96 except that machine 150 is designed to be mounted on top of a cabinet, countertop or other supporting structure.

Machine 150 includes a generally one-piece polymer body 152. Body 152 includes an opening 154 through which a display screen may be viewed when a frame supporting the display screen is inserted in the body. Body 152 further includes device openings 156 and 158 which are used for providing printed receipts and for receiving user cards respectively. Body 152 further includes a sheet dispensing opening 160 through which sheets may be delivered from a sheet dispenser of the type previously discussed. Body 152 also has a roll installation opening 162. Opening 162 overlies a printer roll holding area associated with a printer when the frame supporting such a printer is inserted within the body. It should further be understood that in the operative position of the machine, the roll installation opening 162 is preferably closed by a roll cover (not shown) as described in the prior embodiment.

Body 152 further includes in connection therewith a locking mechanism schematically indicated 164. Locking mechanism 164 in the embodiment shown is used for releasably locking the body to an underlying frame component which holds transaction function devices of the type previously described. A bottom opening 166 enables the frame and devices supported thereon to be inserted into the body 152. With the frame and its associated components in the inserted position, the display screen is aligned with the opening 154, the printer is aligned with the opening 156, the card reader is aligned with the opening 158, and the sheet dispenser is aligned with the sheet dispensing opening 160. Periodic replacement of the printing rolls is accomplished through opening 162 by removing the removable cover. Of course, if it is necessary to service any of the components, the frame may be removed from the inserted position within the body after unlocking the locking mechanism 164.

Figure 14:
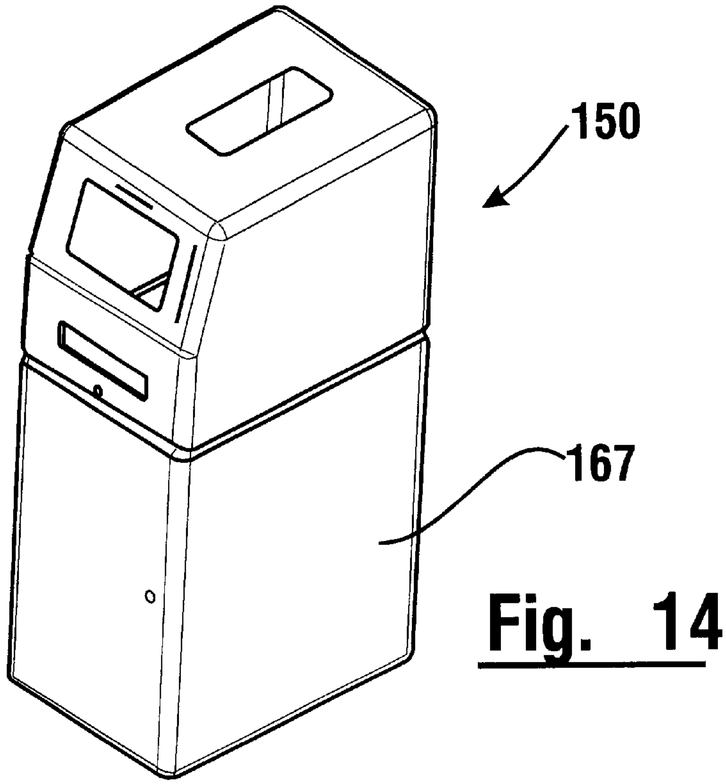
FIG. 14 is a front isometric view of the automated banking machine shown in FIG. 8 shown mounted in connection with a pedestal cabinet.
Figure 15:
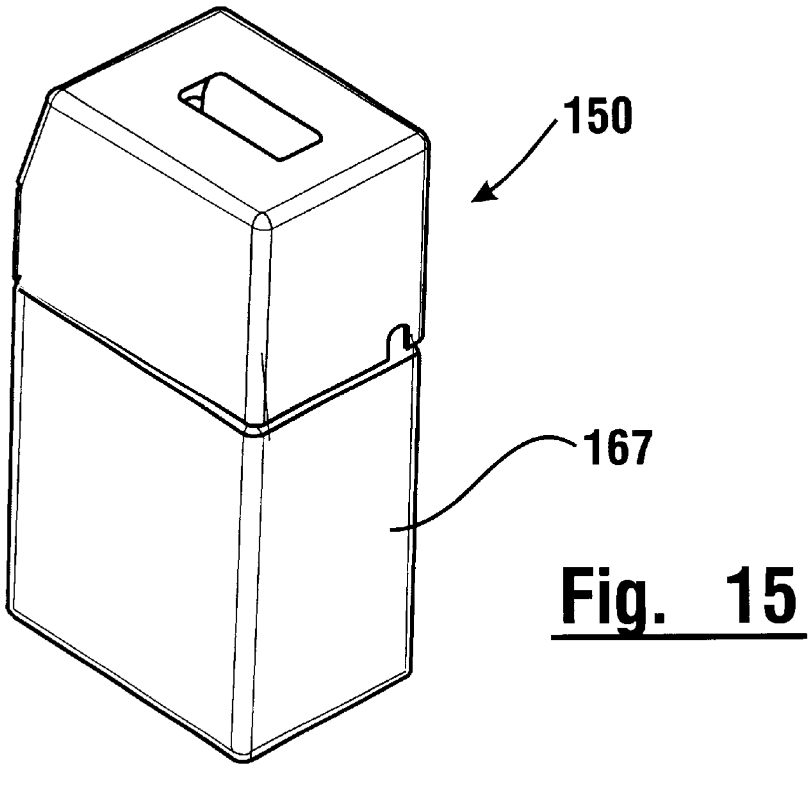
FIG. 15 is a rear isometric view of the automated banking machine and cabinet shown in FIG. 14.

Automated banking machine 150 is an-automated banking machine that has an attractive appearance, is highly resistant to attack and yet is readily serviced. As shown in FIGS. 14 and 15, the machine 150 may be secured by attaching it to a cabinet 167 which can serve as a conduit for anchoring or other securing devices. Similarly, machine 150 may be secured to countertops or similar supporting structures. The supporting structure such as cabinet 167 may be comprised of materials similar to the body of machine 150 or other suitable materials which have the desired appearance and attack-resistant properties.

As will be appreciated, embodiments of the invention provide substantial advantages over conventional automated banking machine enclosures. The exemplary embodiments discussed herein are only a few examples of automated banking machine enclosures that may be achieved by employing the principles of the invention. Numerous other embodiments of the invention may be produced that are within the scope of the present invention.

Thus the automated banking machines of the present invention achieves the above-stated objectives, eliminates difficulties encountered in the use of prior devices and systems and attains the desirable results described herein.

In the foregoing description certain terms have been used for brevity, clarity and understanding. However, no unnecessary limitations are to be implied therefrom, because such terms are for descriptive purposes and are intended to be broadly construed. Moreover, the descriptions and illustrations herein are by way of examples and the invention is not limited to the exact details shown and described.

In the following claims, any feature described as a means for performing a function shall be construed as encompassing any means known to those skilled in the art to be capable of performing the recited function, and shall not be limited to the structures or methods shown in the exemplary embodiment herein or mere equivalents thereof.

Having described the features, discoveries and principles of the invention, the manner in which it is constructed and operated, and the advantages and useful results attained, the new and useful structures, devices, elements, arrangements, parts, combinations, systems, equipment, operations, methods and relationships are set forth in the appended claims.

We claim:

1. An automated banking machine apparatus comprising:

a currency sheet dispenser;

a frame operatively supporting the currency sheet dispenser;

a generally one piece non-metallic body in operatively fixed engagement relative to the frame, wherein the body extends in generally surrounding relation of the frame.

2. The apparatus according to claim 1, wherein the body comprises a plastic, polymer, fiberglass, resin, or glass, or any combination thereof.

3. The apparatus according to claim 2 , wherein the body comprises a polymer.

4. The apparatus according to claim 3, wherein the body comprises a reaction injection molded thermoset olefin material.

5. The apparatus according to claim 1, wherein the frame comprises a plastic, polymer, fiberglass, resin, or glass, or any combination thereof.

6. The apparatus according to claim 5, wherein the frame comprises a polymer.

7. The apparatus according to claim 6, wherein the frame comprises a generally one-piece polymer frame.

8. The apparatus according to claim 7, wherein the frame comprises a reaction injection molded thermoset olefin material.

9. The apparatus according to claim 2, wherein the frame comprises a plastic, polymer, fiberglass, resin, or glass, or any combination thereof.

10. The apparatus according to claim 9, wherein the frame comprises a polymer.

11. The apparatus according to claim 10, wherein the frame comprises a generally one-piece polymer frame.

12. The apparatus according to claim 11, wherein the frame comprises a reaction injection molded thermoset olefin material.

13. The apparatus according to claim 2, further comprising:

at least one input device and at least one output device;

wherein the frame operatively supports the at least one input device and the at least one output device.

14. The apparatus according to claim 13, wherein the at least one output device comprises a display screen, and wherein the body extends in generally surrounding relation of the at least one input device and the display screen, and wherein the body includes at least one opening, wherein the display screen is visible through the at least one opening.

15. The apparatus according to claim 14, wherein the display screen comprises a touch screen.

16. The apparatus according to claim 13, wherein the frame is removably insertable into the body.

17. The apparatus according to claim 16, wherein the body comprises a side opening, and wherein the frame is removably insertable in the side opening of the body.

18. The apparatus according to claim 16, wherein the body comprises a bottom opening, and wherein the frame is removably insertable in the bottom opening of the body.

19. The apparatus according to claim 16, further comprising:

a releasable fastening mechanism;

wherein the fastening mechanism is operative to hold the frame in an inserted position in the body.

20. The apparatus according to claim 16, wherein the frame comprises a generally rectangular housing bounding an interior area, and wherein the sheet dispenser extends in the interior area, and wherein the body includes a sheet opening, and wherein the sheet opening on the body is generally aligned with the sheet dispenser when the frame is inserted in the body.

21. The apparatus according to claim 16, wherein the at least one output device comprises a display screen, and wherein the body includes a display screen opening and an input device opening, and wherein the display screen opening is generally aligned with the display screen and the input device opening is generally aligned with the input device when the frame is inserted in the body.

22. The apparatus according to claim 21, wherein the at least one input device comprises a card reader, and wherein the input device opening comprises a slot in generally aligned relation with the card reader when the frame is inserted in the body.

23. The apparatus according to claim 22, wherein the slot is an elongated slot, and wherein the card reader comprises a magnetic card swipe type card reader in underlying adjacent relation of the elongated slot.

24. The apparatus according to claim 16, wherein the at least one output device comprises a printer in supporting connection with the frame, and further comprising a roll holding area, wherein the roll holding area holds a paper roll in connection with the printer, and wherein the body includes a roll opening, and wherein the roll opening is adjacent the roll holding area when the frame is inserted in the body.

25. The apparatus according to claim 16, wherein the body includes a bottom portion, and wherein when the frame is inserted in the body, the frame is disposed above the bottom portion.

26. The apparatus according to claim 25, wherein the bottom portion includes a frame access opening, and wherein the frame is sized to enable the frame to pass through the frame access opening.

27. An automated banking machine apparatus comprising:

at least one input device, a screen display, and a sheet dispenser;

a non-metallic frame operatively supporting the at least one input device, screen display, and sheet dispenser;

a generally one piece non-metallic body in operatively fixed engagement relative to the frame, wherein the body extends in generally surrounding relation of the frame, and wherein the body includes at least one opening, wherein the display screen is visible through the at least one opening.

28. The apparatus according to claim 27, wherein the body comprises a polymer.

29. The apparatus according to claim 28, wherein the frame comprises a generally one-piece polymer frame.

30. The apparatus according to claim 29, wherein the body and frame each comprise a reaction injection molded thermoset olefin material.

31. A method of enclosing an automated banking machine, comprising:

(a) operatively supporting a currency sheet dispenser with a frame; and (b) locating a generally one piece non-metallic body in operatively fixed engagement relative to the frame, wherein the body extends in generally surrounding relation of the frame.

32. The method according to claim 31 and prior to step (b) further comprising the step of:

forming the body of a plastic, polymer, fiberglass, resin, or glass, or any combination thereof.

33. The method according to claim 32 and prior to step (b) further comprising the step of:

forming the body of a polymer.

34. The method according to claim 33 and prior to step (b) further comprising the step of:

forming the body of a reaction injection molded thermoset olefin material.

35. The method according to claim 31 and prior to step (a) further comprising the step of:

forming the frame of a plastic, polymer, fiberglass, resin, or glass, or any combination thereof.

36. The method according to claim 35 and prior to step (a) further comprising the step of:

forming the frame of a polymer.

37. The method according to claim 36 and prior to step (a) further comprising the step of:

forming the frame as a generally one-piece polymer frame.

38. The method according to claim 37 and prior to step (a) further comprising the step of:

forming the frame of a reaction injection molded thermoset olefin material.

39. The method according to claim 32 and prior to step (a) further comprising the step of:

forming the frame of a plastic, polymer, fiberglass, resin, or glass, or any combination thereof.

40. The method according to claim 39, wherein prior to step (a) comprising the step of:

forming the frame of a polymer.

41. The method according to claim 40 and prior to step (a) further comprising the step of:

forming the frame as a generally one-piece polymer frame.

42. The method according to claim 41 and prior to step (a) further comprising the step of:

forming the frame of a reaction injection molded thermoset olefin material.

43. The method according to claim 32, and further comprising the step of:

(c) operatively supporting at least one input device and at least one output device with the frame, and wherein step (b) comprises the step of locating the body in generally surrounding relation of the at least one input device, the at least one output device, and the sheet dispenser.

44. The method according to claim 43, wherein the at least one output device comprises a display screen, wherein step (a) comprises the step of:

operatively supporting the display screen with the frame.

45. The method according to claim 44, wherein the body comprises at least one opening, and wherein step (b) further comprises the step of:

generally aligning the display screen and the at least one opening so that the display screen is visible through the at least one opening.

46. The method according to claim 45, wherein the display screen comprises a touch screen, wherein step (a) comprises the step of:

supporting the touch screen with the frame.

47. The method according to claim 43, wherein the body comprises at least one opening, and wherein step (b) comprises the step of:

removably inserting the frame in the at least one opening of the body.

48. The method according to claim 47, wherein the at least one opening comprises a side opening, and wherein step (b) comprises the step of:

removably inserting the frame in the side opening of the body.

49. The method according to claim 47, wherein the at least one opening comprises a bottom opening, wherein step (b) comprises the step of:

removably inserting the frame in the bottom opening of the body.

50. The method according to claim 47, wherein the machine comprises a releasable fastening mechanism, and further comprising the step of:

fastening the frame to the body with the releasable fastening mechanism, wherein the fastening mechanism is operative to hold the frame in an inserted position in the body.

51. The method according to claim 47, wherein the body includes a display screen opening and an input device opening, and wherein the at least one output device comprises a display screen, and wherein step (b) further comprises the steps of:

generally aligning the display screen opening with the display screen, and the input device opening with the at least one input device when the frame is inserted in the at least one opening of the body.

52. The method according to claim 47, wherein the frame comprises a generally rectangular housing bounding an interior area, and step (a) comprises the step of:

locating the sheet dispenser in the interior area of the frame.

53. The method according to claim 52, wherein the body includes a sheet opening, and step (b) comprises the step of:

generally aligning the sheet opening on the body with the sheet dispenser when the frame is inserted in the at least one opening of the body.

54. The method according to claim 47, wherein the body includes an input device opening comprising a slot, and wherein the at least one input device comprises a card reader, and wherein step (b) further comprises the step of:

generally aligning the slot with the card reader when the frame is inserted in the at least one opening of the body.

55. The method according to claim 54, wherein the slot is an elongated slot, and wherein the card reader comprises a magnetic card swipe type card reader, and wherein step (b) further comprises the step of:

locating the elongated slot in overlying adjacent relation of the magnetic card swipe type card reader when the frame is inserted in the at least one opening of the body.

56. The method according to claim 47, wherein the at least one output device comprises a printer, wherein step (a) comprises the step of:

operatively supporting the printer with the frame.

57. The method according to claim 56, further comprising a roll holding area, wherein the roll holding area holds a paper roll in connection with the printer, and wherein the body includes a roll opening, and wherein step (b) further comprises the step of:

locating the roll opening adjacent the roll holding area when the frame is inserted in the at least one opening of the body.

58. The method according to claim 47, wherein the body comprises a bottom portion, wherein step (b) comprises the step of:

disposing the frame above the bottom portion of the body when the frame is inserted in the at least one opening of the body.

59. The method according to claim 58, wherein the at least one opening comprises a frame access opening adjacent the bottom portion, and wherein the frame is sized to pass through the frame access opening, and wherein step (b) comprises the step of:

passing the frame through the frame access opening.

60. A method of enclosing an automated banking machine, comprising the steps of:

(a) operatively supporting at least one input device, a screen display, and a sheet dispenser with a non-metallic frame;

(b) locating a generally one-piece non-metallic body in operatively fixed engagement relative to the frame, wherein the body extends in generally surrounding relation of the frame, and wherein the body includes at least one opening, wherein the display screen is visible through the at least one opening.

61. The method according to claim 60 and prior to step (b) further comprising the step of:

forming the body of a polymer.

62. The method according to claim 61, wherein prior to step (a) comprising the step of:

forming the frame as a generally one-piece polymer frame.

63. The method according to claim 62 and prior to step (a) further comprising the steps of:

forming the frame of a reaction injection molded thermoset olefin material; and prior to step (b) comprising the step of:

forming the body of a reaction injection molded thermoset olefin material.

64. An automated banking machine apparatus comprising:

a screen display;

a frame operatively supporting the screen display;

a generally one-piece non-metallic body in operatively fixed engagement relative to the frame, wherein the body extends in generally surrounding relation of the frame, and wherein the body includes at least one opening, wherein the display screen is visible through the at least one opening.

65. The apparatus according to claim 64 further comprising a currency sheet dispenser, wherein the frame operatively supports the currency sheet dispenser.

66. The apparatus according to claim 27, wherein the sheet dispenser comprises a currency sheet dispenser.

67. The method according to claim 60, wherein the sheet dispenser comprises a currency sheet dispenser, wherein step (a) includes operatively supporting the currency sheet dispenser with the frame.

* * * * *